United States Patent [19]

Work

[11] 4,053,340
[45] Oct. 11, 1977

[54] METHOD FOR PRODUCING DISPLAY SIGN PANEL

[75] Inventor: Gerald L. Work, Spokane, Wash.

[73] Assignee: American Sign and Indicator Corporation, Spokane, Wash.

[21] Appl. No.: 708,580

[22] Filed: July 26, 1976

[51] Int. Cl.² .......................... B32B 3/24; B32B 3/26
[52] U.S. Cl. ...................... 156/70; 40/28 C; 156/102; 156/219; 156/252; 156/292; 264/156; 264/293; 264/321
[58] Field of Search ............ 156/252, 219, 101, 102, 156/99, 108, 245, 303.1, 70, 209, 292; 40/28 C, 28 R, 52 R, 61 A, 61 R, 106.5, 136, 62; 181/DIG. 1, 33 GA; 264/48, 284, 293, 321, 156, 163

[56] References Cited

U.S. PATENT DOCUMENTS

| 3,078,948 | 2/1963 | Gildard et al. ............ 181/33 GA |
| 3,082,483 | 3/1963 | Bickford .................... 264/321 |
| 3,161,554 | 12/1964 | Blackford .................. 156/252 |
| 3,560,601 | 2/1971 | Johnson et al. ........... 264/293 X |
| 3,562,938 | 2/1971 | Salam ......................... 40/28 C |
| 3,601,914 | 8/1971 | Fuller, Jr. .................. 40/28 C |
| 3,659,366 | 5/1972 | Woolfolk .................. 40/28 C |
| 3,685,040 | 8/1972 | Hart .......................... 40/28 C |
| 3,724,110 | 4/1973 | Meyerson ................. 40/28 C |

Primary Examiner—Charles E. Van Horn
Assistant Examiner—M. G. Wityshyn
Attorney, Agent, or Firm—Wells, St. John & Roberts

[57] ABSTRACT

A method for producing a panel for a back-lighted display sign comprises the steps of impressing recesses about one surface of a planar sheet of rigid foam to reduce the sheet thickness in a pattern corresponding to a desired pattern of recesses. Apertures are also formed through the sheet at locations each bounded by an identical corresponding portion of each recess. The sheet of foam is then sandwiched between outer cover layers to complete the basic panel structure for a display sign having multiple recesses containing discs which are moved between bi-stable positions covering the apertues or clear of the apertures.

5 Claims, 5 Drawing Figures

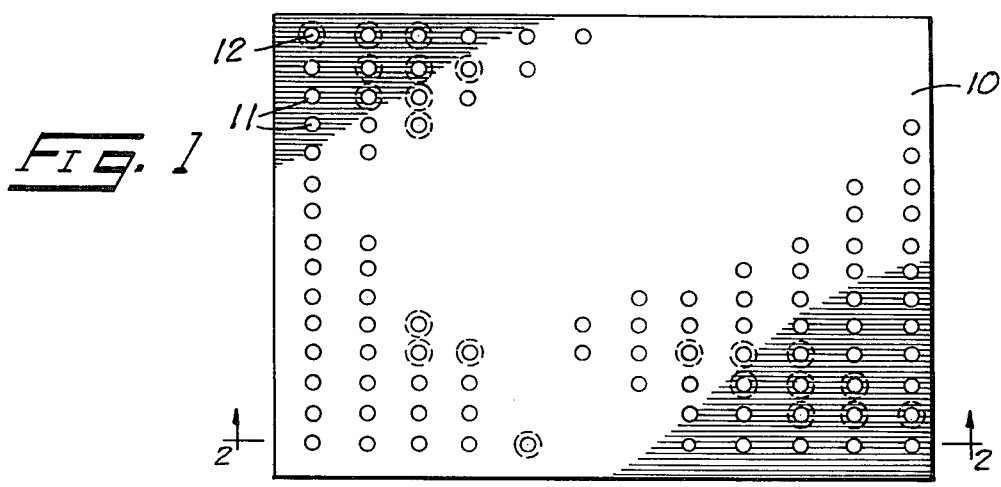
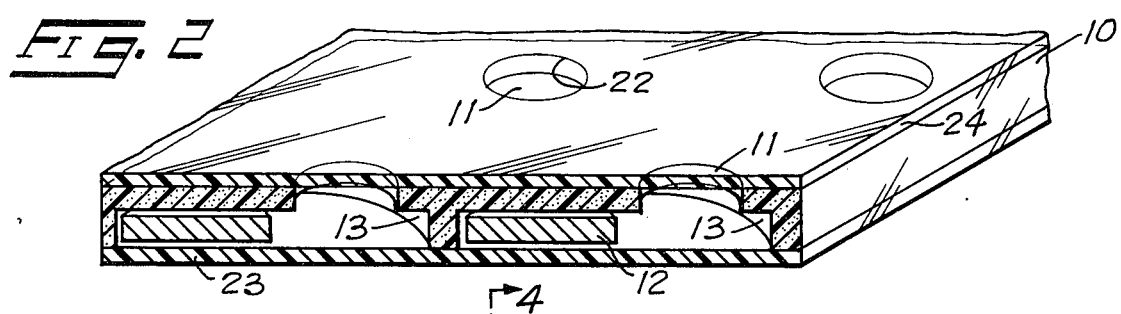
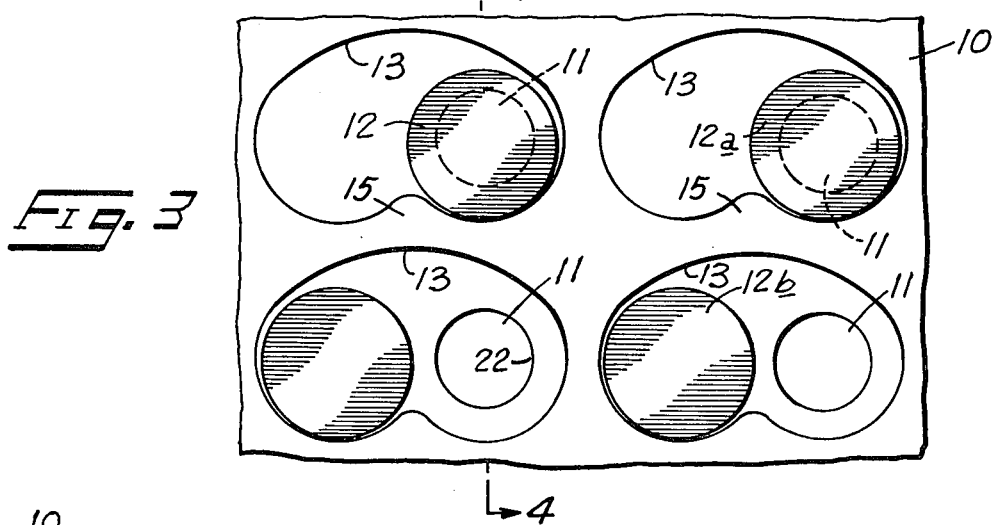
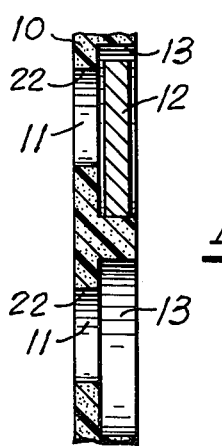
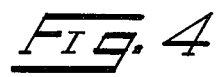
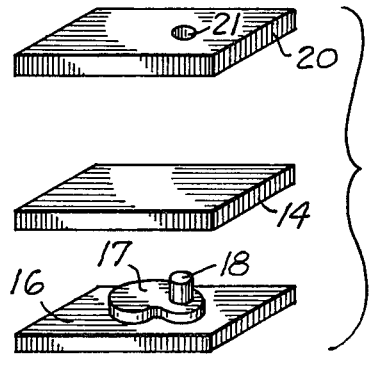

METHOD FOR PRODUCING DISPLAY SIGN PANEL

BACKGROUND OF THE INVENTION

This invention relates to information display signs or devices of the general type illustrated in U.S. Pat. No. 3,562,938 to Salam, granted Feb. 16, 1971. Such devices basically comprise a panel having a plurality of discrete light-transmitting areas arranged along transversely spaced upright columns and surrounded by a background which is preferably, but not essentially, opaque. The panel is normally back-lighted and the desired display is usually viewed as light transmitted through the discrete areas. Circular discs are mounted behind the panel for planar movement of each disc between a first position overlying a light-transmitting area and a second position clear of such area. By arranging the individual discs in one or the other of such positions, any desired pattern of light transmission can be achieved through the individual light-transmitting areas, thereby producing the desired visual pattern on the viewed panel.

Other patents relating to this general type of display are U.S. Pat. Nos. 3,685,040, 3,601,914 and 3,659,366. They are illustrative of prior attempts to fabricate this general type of display by laminating successive sheets of materials to one another.

According to this disclosure, the circular discs are mounted within recesses formed in the panel. The method of producing the panel comprises the step of pressing one surface of a sheet of permanently compressible material by use of a mold having an exterior configuration that is complementary to the desired configuration and pattern of the recesses. The remaining surface of the sheet is maintained in a planar condition. The pressing step reduces the sheet thickness in a pattern that corresponds to the desired pattern of the recesses about the sheet. Normally these recesses are formed along upright columns and transverse lines. Apertures are also formed through the sheet at locations each bounded by an identical corresponding portion of each recess. The recess typically assumes a cardioid shape, with the aperture at one side thereof. By overlaying the sheet of foam with suitable cover layers of light-transmitting material, one can produce an effective rigid panel having only two or three laminations and suitable for use in the general type of display sign described above.

SUMMARY OF THE INVENTION

The present method basically comprises the steps of deforming one surface of a planar sheet of permanently compressible material by pressing the surface against a mold having an exterior configuration complementary to the desired recessed configuration. This pressing step is accomplished while maintaining the remaining surface of the sheet in a planar condition. This reduces the sheet thickness in a pattern that corresponds to the desired pattern of the recesses. The method further comprises the step of forming apertures through the sheet at locations wherein each aperture is bounded by an identical corresponding portion of the respective recesses.

The sheet that is pressed is preferably comprised of foam resin, and is normally a rigid foam. The pressing of the recesses and formation of the apertures can be accomplished simultaneously by using a mold configuration having a projecting punch which extends through the sheet thickness and is receivable within a complementary die engaging the remaining surface of the sheet. Laminating steps are further utilized to overlay light-transmitting sheet material onto the panel on one or both of its sides.

It is a first object of this invention to simplify the fabrication of rigid panels for back-lighted sign structures. The method substitutes easily controlled molding procedures in place of more difficult machining and indexing procedures required by methods used to date.

Another object of the invention is to utilize a method which provides a laminated panel having inherent structural rigidity and light weight.

These and further objects will be evident from the following disclosure and the illustrative embodiments shown in the drawings.

DESCRIPTION OF THE DRAWINGS

FIG. 1 is a front view of the completed display panel, showing a portion of the light-transmitting apertures and indicating the positions of the individual discs in dashed lines;

FIG. 2 is an enlarged fragmentary cross-sectional perspective view taken along line 2—2 in FIG. 1;

FIG. 3 is an enlarged fragmentary rear elevational view of the pressed foam sheet;

FIG. 4 is an enlarged transverse sectional view along line 4—4 in FIG. 3; and

FIG. 5 is a schematic perspective view showing pressing of the foam sheet.

DESCRIPTION OF THE PREFERRED EMBODIMENTS

As shown in FIG. 1, this disclosure relates to a display sign comprising an upright back-lighted panel 10 having a plurality of discrete light-transmitting areas 11 arranged along transversely spaced upright columns and intersecting transverse lines. While the drawings illustrate the columns as being vertical and the lines as being horizontal, this is not a necessary limitation to the application of the disclosure, since they might be arranged along oblique rows forming angles to either the vertical or horizontal or both. Similarly, while the panel 10 is normally arranged for display in a vertical position, it can be arranged in other upright positions oblique to the vertical when desired.

Immediately rearward of the panel 10 are located a plurality of circular discs individually movable between positions overlying the light-transmitting areas and clear of such areas. These discs 12 are mounted loosely behind panel 10 and are shifted between their alternate positions by noncontacting means (not shown). Discs 12 are normally opaque. Examples of magnetic devices for moving the discs are described in U.S. Pat. No. 3,562,938 to Salam, which is hereby incorporated by reference. Other noncontacting means for applying force to the discs 12 can be utilized, such as electrostatic force applying devices. The precise means by which the discs are shifted to produce the desired visual display in conjunction with the light-transmitting areas 11 does not form a part of the present disclosure except as a general understanding of such movement is necessary to comprehend the development and application of this disclosure.

FIGS. 2 and 3 diagrammatically illustrate the essential relationship of the panel structure as it interrelates to disc 12. Disc 12 is moved in a planar position from a first position (shown by disc 12a) where it overlies a light-transmitting area 11 in the panel 10 to a second position (shown by disc 12b) where it is clear of the light-transmitting area 11 and is behind the background area about panel 10.

Each disc 12 is bounded within a cardioid shaped recess 13 in a layer of sheet material generally designated by the numeral 14. The layer 14 preferably comprises a sheet of rigid foam such as polystyrene, which is permanently compressible or deformable with or without the application of heat. While a rigid foam material is desirable for lightweight and structural purposes, other permanently compressible materials having suitable structural properties can be substituted.

Each recess 13 is symmetrical about a center vertical line and includes a lower projection 15 that basically divides the recess 13 into two transverse parts. The individual discs 12 rest within the recess 13 in one of two bi-stable positions to each side of the recess. At one of these positions, the disc 12 overlies or covers the light-transmitting area 11 bounded within the recess 13. In its alternate position, the disc is clear of the area 11. By moving the discs between these two positions, one can selectively arrange the discs so as to visually present any desired display on the panel 10 illustrated in FIG. 1.

To produce the panel 10 economically and to provide sufficient rigidity and structural strength for both interior and exterior applications, the present method of fabricating the panel has been devised. As illustrated in FIG. 5, the planar sheet of permanently compressible material is pressed against a mold 16 having a series of projections 17 presenting an exterior configuration facing sheet 14 that is complementary to the desired recessed configuration about the sheet 14. Heat might be applied according to known molding techniques. The projections 17 are pressed against sheet 14 to a depth corresponding to the desired depth of the recesses 13.

As illustrated, the individual projections 17 on mold 16 each have protruding cylindrical punches 18 formed integrally with mold 16, the depth of each punch 18 being in excess of the remaining sheet thickness at each recess 13. Each punch 18 therefore extends completely through the thickness of sheet 14 to form an aperture through the sheet in conjunction with a complementary die 20 having a planar surface in engagement with the opposed surface of sheet 14. The die 20 serves as a planar backing member to control the compression or reduction in thickness of the sheet material at each recess 13, while also presenting apertures 21 complementary to the individual punches 18 to assure clean, accurate formation of the apertures 22 about sheet 14, which comprise the light-transmitting areas 11 in the completed panel.

The simultaneous formation of the recesses 13 and apertures 22 by pressing sheet 14 between mold 16 and die 20 forms the basic panel structure in a single step and eliminates the need for indexing apertures 22 with respect to preformed recesses 13 as would be the case when using individual layers to bound the recesses 13 and to contain the apertures 22. However, if desired, apertures 22 can be separately formed apart from the formation of recesses 13. The apertures 22 can be formed or machined by any suitable process apart from the pressing step involved in the production of recess 13.

After formation of the recesses 13 and apertures 22, the discs 12 are placed individually within the recesses of sheet 14 through which the recesses 13 are impressed. Sheet 14 is then laminated to a rear cover sheet 23 by conventional laminating or adhesive techniques. To provide a completely sealed structure, it is also necessary to laminate a front sheet 24 over the apertures 22.

The rear cover sheet 23, when used for a back-lighted display, will normally be constructed of transparent or translucent sheet material, such as plastic or glass. At least those areas corresponding to the light-transmitting areas 11 in the finished panel 10 must be capable of transmitting light from behind the panel. The discs 12 are normally opaque, although they can be translucent. If the pressed sheet 14 is opaque, both overlying sheets 23, 24 can be transparent or translucent. If the sheet 14 is itself translucent, one or the other of the sheets 23, 24 should be opaque, except about the light-transmitting areas 11.

As an illustration of a suitable combination, the cover sheet 23 shown in FIG. 2 is transparent. The sheet of rigid foam 14 is basically translucent. The front sheet 24 is also transparent, but has a coating that is opaque. The coating is applied in a background pattern defining the circular light-transmitting areas 11, which are therefore transparent. When back-lighted, the panel 10 will present a series of light dots surrounded by an opaque background. By moving the discs 12 to cover or open selected light-transmitting areas 11, a contrasting display can be visualized between the lighted dots and the unlighted dots.

Modifications may be made in the basic method described without deviating from the general purpose of this disclosure. The scope of the claimed process is set out in the following claims.

Having thus described my invention, I claim:

1. A method for producing a panel for a display sign wherein the panel has a pattern of recesses each partially intersected by a light-transmitting area, and containing discs movable between bi-stable positions covering or clear of the light-transmitting areas, comprising the following steps:

deforming one surface of a planar sheet of permanently compressible material by pressing said one surface of the sheet against a mold having an exterior configuration complementary to the desired recess configuration while maintaining the remaining surface of the sheet in a planar condition to thereby reduce the sheet thickness in a pattern corresponding to the desired pattern of recesses;

forming apertures through the sheet at locations each bounded by a corresponding portion of each recess;

placing within each recess a circular disk having a diameter adequate to overlie the aperture formed therein; and laminating said one surface of the sheet to a layer of light-transmitting sheet material.

2. A method as set out in claim 1 wherein the sheet is comprised of foamed resin.

3. A method as set out in claim 1 wherein the sheet is comprised of an opaque rigid foamed resin.

4. A method as set out in claim 1 wherein the apertures and recesses are formed simultaneously by pressing the sheet against a mold having a projecting punch that extends through the sheet thickness and is receivable within a complementary die in engagement with the remaining surface of the sheet.

5. A method as set out in claim 1 comprising the following additional step:

laminating said remaining surface of the sheet to a layer of light-transmitting sheet material.

* * * * *